(12) United States Patent
Xie

(10) Patent No.: US 10,443,669 B2
(45) Date of Patent: Oct. 15, 2019

(54) CLUTCH-BRAKE APPARATUS

(71) Applicant: YANG-ZHOU WEIBANG GARDEN MACHINE COMPANY LIMITED, Yangzhou, Jiangsu (CN)

(72) Inventor: Chungan Xie, Jiangsu (CN)

(73) Assignee: YANGZHOU WEIBANG GARDEN MACHINE COMPANY LIMITED, Yangzhou, Jiangsu (CN)

( * ) Notice: Subject to any disclaimer, the term of this patent is extended or adjusted under 35 U.S.C. 154(b) by 66 days.

(21) Appl. No.: 15/742,182

(22) PCT Filed: Apr. 22, 2016

(86) PCT No.: PCT/CN2016/079948
§ 371 (c)(1),
(2) Date: Jan. 5, 2018

(87) PCT Pub. No.: WO2017/147990
PCT Pub. Date: Sep. 8, 2017

(65) Prior Publication Data
US 2018/0216685 A1  Aug. 2, 2018

(30) Foreign Application Priority Data

Mar. 2, 2016  (CN) .......................... 2016 1 0115710

(51) Int. Cl.
*F16D 67/02*  (2006.01)
*F16D 13/56*  (2006.01)
(Continued)

(52) U.S. Cl.
CPC ............. *F16D 67/02* (2013.01); *F16D 13/26* (2013.01); *F16D 13/56* (2013.01); *F16D 13/66* (2013.01);
(Continued)

(58) Field of Classification Search
CPC .......... F16D 67/02; F16D 13/40; F16D 13/46; F16D 13/26; F16D 2023/123
See application file for complete search history.

(56) References Cited

U.S. PATENT DOCUMENTS 5,411,112 A * 5/1995 Jephcott .................... E04G 1/20
                                                           182/84
6,464,055 B1  10/2002 Wians
(Continued)

FOREIGN PATENT DOCUMENTS

CN  1452454 A  10/2003
CN  1490536 A   4/2004
(Continued)

*Primary Examiner* — Stacey A Fluhart
(74) *Attorney, Agent, or Firm* — Hudak, Shunk & Farine Co., LPA

(57) ABSTRACT

A clutch-brake device having an actuating disc, a braking disc, a shaft sleeve, a friction disc, a main coupling body, an intermediate disc, and a cutting tool seat. The coupling and dis-coupling between the main coupling body and a flange of the shaft sleeve is achieved by a cooperative motion between the intermediate disc and the adjacent main coupling body and the cutting tool seat. The clutch-brake device can be used for coupling of the engine and cutting blades of a lawn mower or other applications, and is reliable, of high load capability, stable and durable.

14 Claims, 8 Drawing Sheets

(51) Int. Cl.
*F16D 13/66* (2006.01)
*F16D 55/38* (2006.01)
*F16D 13/26* (2006.01)
F16D 55/00 (2006.01)
F16D 69/00 (2006.01)
F16D 121/14 (2012.01)
F16D 23/12 (2006.01)

(52) U.S. Cl.
CPC ........ *F16D 55/38* (2013.01); *F16D 2023/123* (2013.01); *F16D 2055/0075* (2013.01); *F16D 2069/002* (2013.01); *F16D 2121/14* (2013.01)

(56) References Cited

U.S. PATENT DOCUMENTS

| 9,988,249 B2 * | 6/2018 | Maghsoodi | B66D 1/12 |
| 2009/0159392 A1 * | 6/2009 | Vaughn | B62D 11/08 |
| | | | 192/49 |

FOREIGN PATENT DOCUMENTS

| CN | 103256323 A | 8/2013 |
| JP | 05231439 A | 9/1993 |

* cited by examiner

CLUTCH-BRAKE APPARATUS

FIELD OF THE INVENTION

The present invention relates to a mechanical coupling device, in particular, a clutch-brake device.

BACKGROUND OF THE INVENTION

Chinese patent application publication no. CN 1452454 A discloses a friction coupling device comprising a friction component including a braking surface and a clutch surface in a plane different from the braking surface; a spring abutting against the friction part; a braking component proximate to the braking surface; the braking component being installed facing the friction component and able to rotate with respect thereto; and a brake actuator coupled with the braking component.

Chinese patent application publication no. CN 1490536 A discloses a clutch/brake assembly comprising a first cover piece having a brake surface; an input shaft connected to the first cover piece for rotating with respect to the first cover piece; at least two input pieces connected to the input shaft and rotated with the shaft, and the input pieces being able to move along the shaft; a brake pad having a first friction surface and a second friction surface, and the brake pad being able to move along the shaft; a biasing element which biases the brake pad against the brake surface of the first cover piece so as to prevent the brake pad from rotating with respect to the first cover piece; a second cover piece coupled to the input shaft and rotated with respect to the input shaft and the first cover piece, and the second cover piece having a third friction surface; and a brake assembly operatively being able to disengage the brake pad from the brake surface, and operatively be able to drive the first, the second and the third friction surfaces to engage with the input piece.

Clutch-brake devices that are easy to operate, of high load capability, stable, durable and reliable are still required.

SUMMARY OF THE INVENTION

A clutch-brake device is provided in the present invention to achieve the above-identified objective. The clutch-brake device can be used to carry out brake and re-engagement by simply operate the handle of an actuating disc, and is reliable, of strong load capability, stable and durable.

A clutch-brake device of the present invention comprises: a shaft sleeve comprising a shaft sleeve flange and a recessed portion extending inward from a bottom side of the shaft sleeve flange, the recessed portion comprising a first main coupling surface, the shaft sleeve being coupled to a driving shaft at a top end thereof such that the shaft sleeve is able to rotate with the driving shaft, and the shaft sleeve being fixedly connected at a bottom end thereof with the driving shaft; a cutting tool seat mounted to a lower end of the shaft sleeve by means of a first bearing and a first limit ring, the cutting tool seat comprising a top side and a bottom side for mounting a cutting tool, the cutting tool seat being provided with a plurality of indentations in an outer wall thereof, and the cutting tool seat being provided with outer teeth on one end thereof; an actuating disc being mounted to the shaft sleeve by means of a second bearing and a second limit ring, the actuating disc being provided along a circumferential direction with a plurality of taper grooves in a bottom side thereof; a braking disc being provided in a tope side thereof along a circumferential direction with a plurality of taper grooves cooperating with the plurality of taper grooves in the bottom side of the actuating disc; a plurality of steel balls being able to roll along both the taper grooves provided in the bottom side of the actuating disc and the taper grooves provided in the top side of the braking disc, so as to cause the braking disc to move in the axial direction; a plurality of first biasing springs having top ends that are provided passing biasing spring holes provided in the actuating disc and biasing spring holes provided in the braking disc, and secured to fixing holes provided in the actuating disc for fixing ends of the biasing springs, so as to connect the actuating disc and the braking disc together; a friction disc provided under the braking disc and the shaft sleeve flange, and a top side of the friction disc being attached with a friction material in order to form a friction surface, a cylindrical wall being extended from a bottom side of the friction disc, and the cylindrical wall comprising a plurality of openings along a circumferential direction; an intermediate disc comprising a top side and a bottom side, the top side being provided therein with a plurality of top side taper grooves, the intermediate disc being provided with a plurality of projections extending radially from an outer circumference thereof, the projections comprising biasing spring seat cavities therein, the plurality of projections being fit in the plurality of openings of the friction disc and able to move therein, and being received in the plurality of indentations of the cutting tool seat; a main coupling body comprising a top end having a recessed portion, inner teeth to be engaged with outer teeth of the cutting tool seat, a second main coupling surface and a bottom side, the second main coupling surface being adapted to be coupled with the first coupling surface of the shaft sleeve flange, the main coupling body being provided in the bottom side along a circumferential direction with a plurality of bottom side taper grooves cooperating with the plurality of top side taper grooves of the intermediate disc; a second biasing spring sitting in the recessed portion of the main coupling body between the bottom surface of the recessed portion and a third limit ring of the cutting tool seat; a plurality of second steel balls being able to roll along the bottom side taper grooves of the main coupling body and the top side taper grooves of the intermediate disc, so as to cause the main coupling body to move in the axial direction; and a plurality of third biasing springs sitting respectively between the bottom surfaces of a plurality of biasing spring seat cavities of the intermediate disc and the bottom side of the friction disc.

In an embodiment, at least a portion of the main coupling body is a frustoconical body, and the second main coupling surface being at least a portion of an outer surface of the frustoconical body, and the first main coupling surface being at least a portion of an inner conical surface of the recessed portion of the shaft sleeve.

In another embodiment, the main coupling body being a cylindrical body, and the second main coupling surface being at least a portion of a top surface of the cylindrical body, the first main coupling surface being at least a portion of a top end surface of the recessed portion of the shaft sleeve.

In a preferred embodiment, at least one of the first main coupling surface and the second main coupling surface is provided with a friction material.

In another aspect, a clutch-brake device of the present invention comprises: a shaft sleeve comprising a shaft sleeve flange and a recessed portion extending inward from a bottom side of the shaft sleeve flange, the recessed portion comprising a first main coupling surface, the shaft sleeve being coupled to a driving shaft at a top end thereof such that the shaft sleeve is able to rotate with the driving shaft, and the shaft sleeve being fixedly connected at a bottom end thereof with the driving shaft; a cutting tool seat mounted to a lower end of the shaft sleeve by means of a first bearing and a first limit ring, the cutting tool seat comprising a top side and a bottom side for mounting a cutting tool, the top side being provided with a plurality of top side taper grooves along a circumferential direction, the cutting tool seat being provided with a plurality of indentations in the outer wall thereof, and the cutting tool seat being provided with outer teeth on one end thereof; an actuating disc mounted to the shaft sleeve by means of a second bearing and a second limit ring, the actuating disc being provided with a plurality of taper grooves in a bottom side thereof along a circumferential direction; a braking disc being provided in a top side thereof along a circumferential direction with a plurality of taper grooves cooperating with the plurality of taper grooves in the bottom side of the actuating disc; a plurality of first steel balls able to roll along both the taper grooves provided in the bottom side of the actuating disc and the taper grooves provided in the top side of the braking disc, so as to cause the braking disc to move in an axial direction; a plurality of first biasing springs having top ends that are provided passing respective biasing spring holes provided in the actuating disc and respective biasing spring holes provided in the braking disc, and secured to respective fixing holes provided in the actuating disc for fixing ends of the biasing springs, so as to connect the actuating disc and the braking disc together; a friction disc provided under the braking disc and the shaft sleeve flange, and a top side of the friction disc being attached with a friction material in order to form a top friction surface, a cylindrical wall being extended from a bottom side of the friction disc, and the cylindrical wall comprising a plurality of openings along a circumferential direction; an intermediate disc comprising a top side and a bottom side, the top side being provided therein with a plurality of top side taper grooves along a circumferential direction, the bottom side being provided therein with a plurality of bottom side taper grooves along a circumferential direction, the intermediate disc being provided with a plurality of projections extending radially from an outer circumference thereof, the projections comprising biasing spring seat cavities therein, the plurality of projections being fit in the plurality of openings of the friction disc and able to move therein, and being received in the plurality of indentations of the cutting tool seat; a main coupling body comprising a top end having a recessed portion, inner teeth to be engaged with the outer teeth of the cutting tool seat, a second main coupling surface and a bottom side, the second main coupling surface being adapted to be coupled with the first main coupling surface of the shaft sleeve flange, the main coupling body being provided in the bottom side along a circumferential direction with a plurality of bottom side taper grooves cooperating with the plurality of top side taper grooves of the intermediate disc; a second biasing spring sitting in the recessed portion of the main coupling body between the bottom surface of the recessed portion and a second limit ring of the cutting tool seat; a plurality of second steel balls able to roll along the bottom side taper grooves of the main coupling body and the top side taper grooves of the intermediate disc, so as to cause the main coupling body to move in the axial direction; a plurality of third steel balls able to roll along the bottom side taper grooves of the intermediate disc and the top side taper grooves of the cutting tool seat, so as to cause the intermediate disc to move in the axial direction; a plurality of third biasing springs sitting respectively between bottom surfaces of the plurality of biasing spring seat cavities and the bottom side of the friction disc.

In an embodiment, at least a portion of the main coupling body being a frustoconical body, and the second main coupling surface being at least a portion of an outer surface of the frustoconical body, and the first main coupling surface being at least a portion of an inner conical surface of the recessed portion of the shaft sleeve.

In another embodiment, the main coupling body being a cylindrical body, and the second main coupling surface being at least a portion of a top surface of the cylindrical body, the first main coupling surface being at least a portion of a top end surface of the recessed portion of the shaft sleeve.

In a preferred embodiment, at least one of the first main coupling surface and the second main coupling surface is provided with a friction material.

The clutch-brake device of the present invention can be used in a lawn mower, but can also be used in other similar applications.

DETAILED DESCRIPTION OF THE INVENTION

Figure 1:
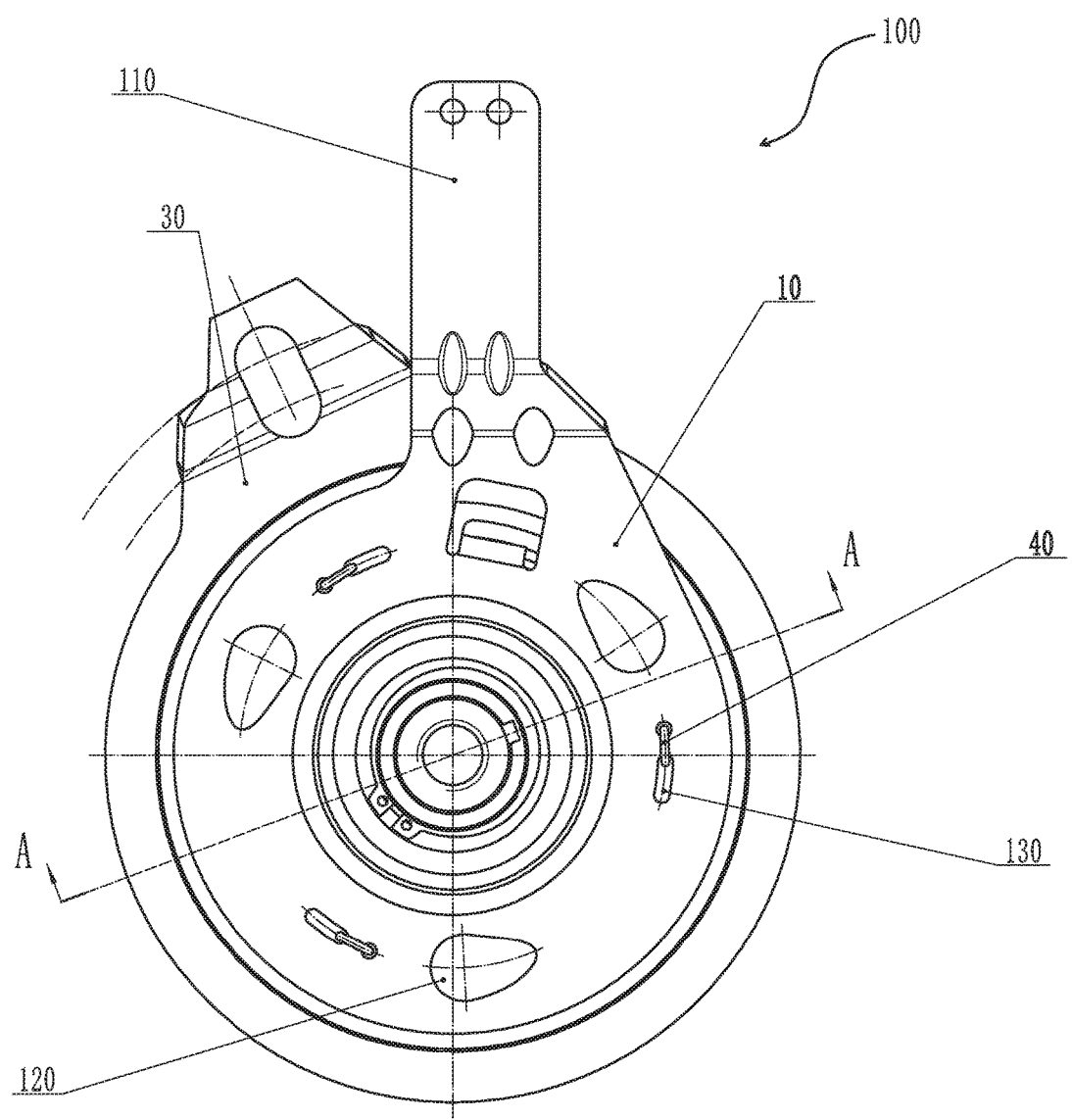
FIG. 1 is a schematic top view of a clutch-brake device of the present invention.

The present invention will be further described by referring to the accompanying drawings. It should be understood that the embodiments illustrated in the drawings are merely for describing the invention and not necessarily drawn in the actual size or in scale. Therefore, the accompanying drawings shall not be construed as any limitation to the present invention. The scope of the invention would rather be defined by the appended claims.

It should also be understood that the directional terms such as "upper", "lower", "inside", "outside", "inner", "outer", "top", "bottom" or the like that may be used herein are merely terms for describing relative positions of the parts or components of interest, and they should not be construed as limitations to the present invention in any way.

It should be understood that like or similar reference numerals represent the like or similar parts, components or features, and for brevity and clarity, in some accompanying drawings, reference numerals are not provided for all the parts, components or features. Thus, a cross reference to other accompanying drawings and the detailed description should be made when reading a drawing.

Referring now to FIGS. 1, 2, 3, 4 and 5, a clutch-brake device 100 of the present invention comprises an actuating disc 10, a braking disc 50, a shaft sleeve 41, a friction disc 50, a frustoconical body 60, an intermediate disc 70 and a cutting tool seat 80.

The shaft sleeve 41 is coupled at one end thereof to a driving shaft 19 by a means known in the art, such as by key-slot engagement 195, wherein the driving shaft 19 is inserted in a shaft hole 18 formed in the shaft sleeve 41, and the shaft sleeve 41 is fixedly connected at the other end thereof to the driving shaft 19 by a screw bolt 90. As such, the shaft sleeve 41 is coupled with the driving shaft 19 and can rotate synchronously with the driving shaft 19.

The driving shaft 19 may be a particular power input shaft or directly an output shaft of a power source. The power source may be an internal combustion engine provided on a lawn mower, but is not limited thereto.

The cutting tool seat 80 is mounted to the lower end of the shaft sleeve 41 by means of a first bearing 95 and a first limit ring 98. The cutting tool seat 80 comprises a top end surface and a bottom end surface 210 for mounting a cutting tool. A plurality of indentations 803 are provided in an outer peripheral wall of the cutting tool seat 80, and the cutting tool seat 80 is provided with external teeth 804.

The actuating disc 10 is mounted to the shaft sleeve 41 by means of a second bearing 15 and a second limit ring 13, but does not rotate with the shaft sleeve 41.

The bottom side of the actuating disc 10 is provided with a plurality of taper grooves 120 therein along a circumferential direction. Preferably, three taper grooves 120 are provided evenly or spaced apart equally along the circumferential direction. Correspondingly, the top side of the braking disc 30 is also provided with a plurality of taper grooves 320 therein, and preferably, three taper grooves 320 are provided evenly or spaced apart equally along the circumferential direction. Furthermore, a plurality of steel balls, such as corresponding three steel balls 20 are held by retention holes 251 of a steel ball retainer 25 that is located between the bottom side of the actuating disc 10 and the top side of the braking disc 30. The steel balls 20 can roll along both the taper grooves 120 provided in the bottom side of the actuating disc 10 and the cooperating taper grooves 320 provided in the top side of the braking disc, so as to cause the braking disc 30 to move in the axial direction.

A plurality of first biasing springs 40 having top ends 401 that are provided passing the biasing spring holes 130 provided in the actuating disc 10 and the biasing spring holes 330 provided in the braking disc 30, and secured to fixing holes 140 provided in the actuating disc 10 for fixing the ends of the biasing springs, so as to connect the actuating disc 10 and the braking disc 30 together. With the biasing effect of the spring, when a braking operation is not initiated, the biasing spring 40 bias the braking disc 30 upward and prevents the braking disc 30 from being in contact with the friction disc 50.

In a preferred embodiment, a plurality of biasing springs 40 are provided evenly in a circumferential direction. More preferably, three biasing springs 40 are provided evenly in the circumferential direction.

The friction disc 50 is provided under the braking disc 30 and the shaft sleeve flange 45, and the top side of the friction disc 50 is attached with a friction material in order to form a friction surface 510. The process of attachment of the friction material to the friction disc and the type of the friction material can be any process or type known in the art, such as attachment by riveting; and the friction material can be provided in the form of radiated slots, or in the form of Archimedean spiral, which are known to one skilled in the art, and will not be described in detail.

A cylindrical wall 520 is extended from the bottom side of the friction disc 50, and the cylindrical wall 520 comprises a plurality of openings in the circumferential direction, such as for example, three openings 503 for receiving a plurality of (such as for example, 3) corresponding projections 703 (can also be called as biasing spring seats) extending radially from the outer circumference of the intermediate disc 70, and third biasing springs 78 sit in the biasing spring seat cavities provided in the biasing spring seats 703 and abut against the bottom of the biasing spring seat cavities, and the biasing spring seats 703 abut against the bottom surface of the friction disc. In this way, the friction disc 50 and the intermediate disc 70 can be moved together, and the biasing spring seats 703 can create a biasing force against the friction disc 50.

A main coupling body or a frustoconical body 60 (comprising a lower cylindrical body) is provided in the axial direction under the friction disc by means of a third limit ring 61 installed on the cutting tool seat 80 and a second biasing spring 62, and in the axial direction over the intermediate disc 70. A plurality of, for example three top side taper grooves 701 and three bottom side taper grooves 702 are provided respectively in the top side and the bottom side of the intermediate disc 70 along a respective circumferential direction, with the top side taper grooves 701 corresponding to the bottom side taper grooves 601 of the frustoconical body 60; second steel balls 65 are provided in the top taper grooves 701 and the bottom taper grooves 601 of the frustoconical body 60, and can roll along the top taper grooves 701 and the bottom taper grooves 601 of the frustoconical body 60, so as to cause the frustoconical body 60 to move in the axial direction.

A plurality of, such as for example, three top side taper grooves 802 are provided in the top side of the cutting tool seat 80 along a circumferential direction, and corresponding to the taper grooves 702 in the bottom side of the intermediate disc 70. Third steel balls 75 are provided in the bottom side taper grooves 702 of the intermediate disc 70 and in the top side taper grooves 802 of the cutting tool seat 80, and can roll along the bottom side taper grooves 702 and the top side taper grooves 802, so as to cause the intermediate disc 70 to move in the axial direction.

The top side taper grooves 701 and the bottom side taper grooves 702 of the intermediate disc 70, the bottom side taper grooves 601 of the frustoconical body 60 as well as the top side taper grooves 802 of the cutting tool seat 80 should be designed as such that the axial movements caused by the rolling of the second steel balls 65 and the third steel balls 75 should be in the same direction, or at least not offset each other.

Alternatively, the bottom side taper grooves 702 of the intermediate disc 70 and the top side taper grooves 802 of the cutting tool seat 80 as well as the third steel balls 75 may also be omitted. In this case, only the top side taper grooves 701 of the intermediate disc 70 and the bottom side taper grooves 601 of the frustoconical body 60 as well as the second steel balls 65 are used to catty out the axial movement of the frustoconical body 60. Accordingly, the sizes and/or shapes of the taper grooves and the steel balls should be designed as such that can achieve the objective of the movement of the respective components, and such designs would be easy to one skilled in the art, and thus will not be described in detail.

However, it would be preferable to use all of the top side taper grooves 701 and the bottom side taper grooves 702 of the intermediate disc 70, the bottom side taper grooves 601 of the frustoconical body 60, the top side taper grooves 802 of the cutting tool seat 80, as well as the second steel balls 65 and the third steel balls 75, as this design would ensure that the frustoconical body 60 can achieve more axial displacement when the intermediate disc 70 rotates by the same angle.

In order to achieve coupling of the frustoconical body 60 with the cutting tool seat 80, the inner teeth 604 of the frustoconical body 60 should be designed with a structure that can engage with the outer teeth 804 of the cutting tool seat 80. Additionally, the biasing spring seats 703 of the intermediate disc 70 can move in the indentations 803 provided in the outer wall of the cutting tool seat 80 such that the third steel balls 75 can roll along the bottom side taper grooves 702 of the intermediate disc 70 and the top side taper grooves 802 of the cutting tool seat 80.

The cutting tool seat 80 is mounted onto the shaft sleeve 41 by means of the first limit ring 98 and the first bearing 95. However, it cannot rotate directly with the shaft sleeve 41.

When a lawn mower is in use, i.e., the cutting tool seat 80 rotates to cause the cutting tool to work, the first steel balls 20 are respectively in the deep areas of the taper grooves 120 provided evenly in the bottom side of the actuating disc 10 along a circumferential direction, and at the same time, in the deep areas of the corresponding taper grooves 320 provided in the top side of the braking disc 30, and are held at these places by biasing springs 40. Additionally, the second steel balls 65 are respectively in the shallow areas of the taper grooves 701 provided in the top side of the intermediate disc 70 and in the shallow areas of the taper grooves 601 provided in the bottom side of the frustoconical body 60, and the third steel balls 75 are respectively in the shallow areas of the taper grooves 702 provided in the bottom side of the intermediate disc 70 and in the shallow areas of the taper grooves 802 provided in the top side of the cutting tool seat 80. As such, the braking disc 30 and the friction disc 50 are in the separated and disengaged state, while the bottom surface 451 of the shaft sleeve flange 45 is engaged with the top surface 510 of the friction material of the friction disc 50, and the inner conical surface 452 of the shaft sleeve flange 45 is engaged with the outer surface 602 of the frustoconical body 60, so as to cause the frustoconical body 60 to rotate, and then cause the cutting tool seat 80 to rotate.

Figure 2:
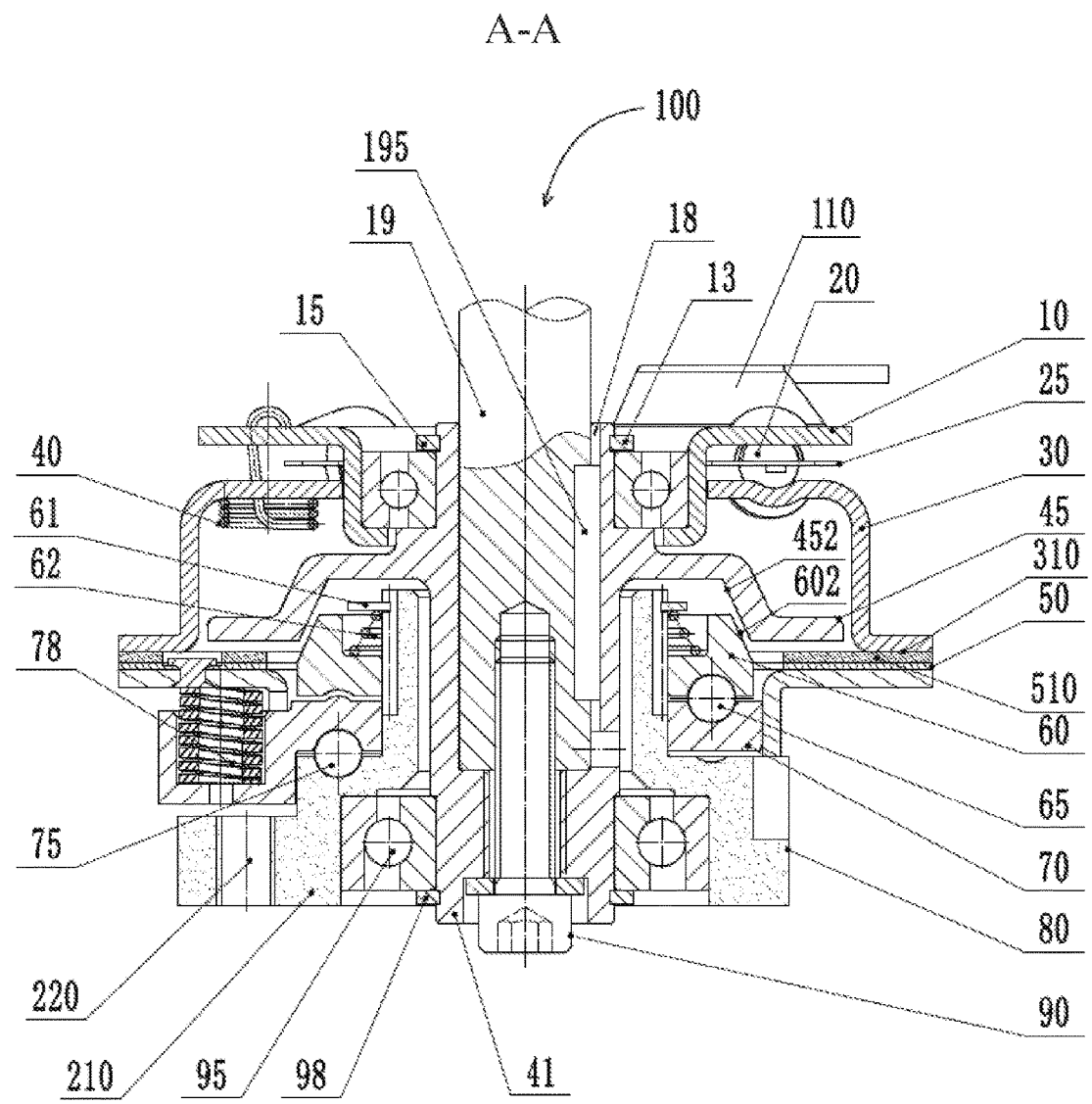
FIG. 2 is a schematic cross-sectional diagram of the clutch-brake device of FIG. 1, with the clutch-brake device in the braking state.
Figure 3:
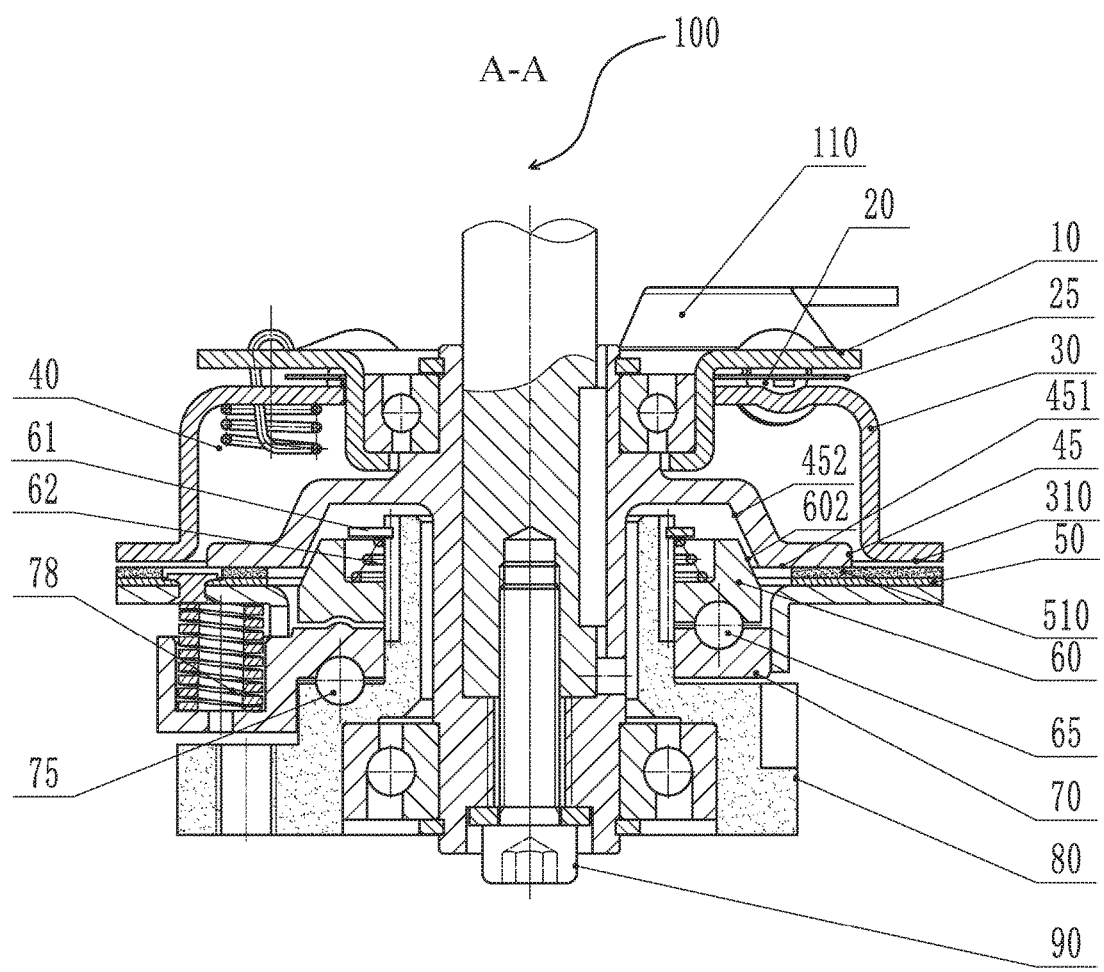
FIG. 3 is a schematic cross-sectional diagram of the clutch-brake device of FIG. 1, with the clutch-brake device in the first coupling state.
Figure 4:
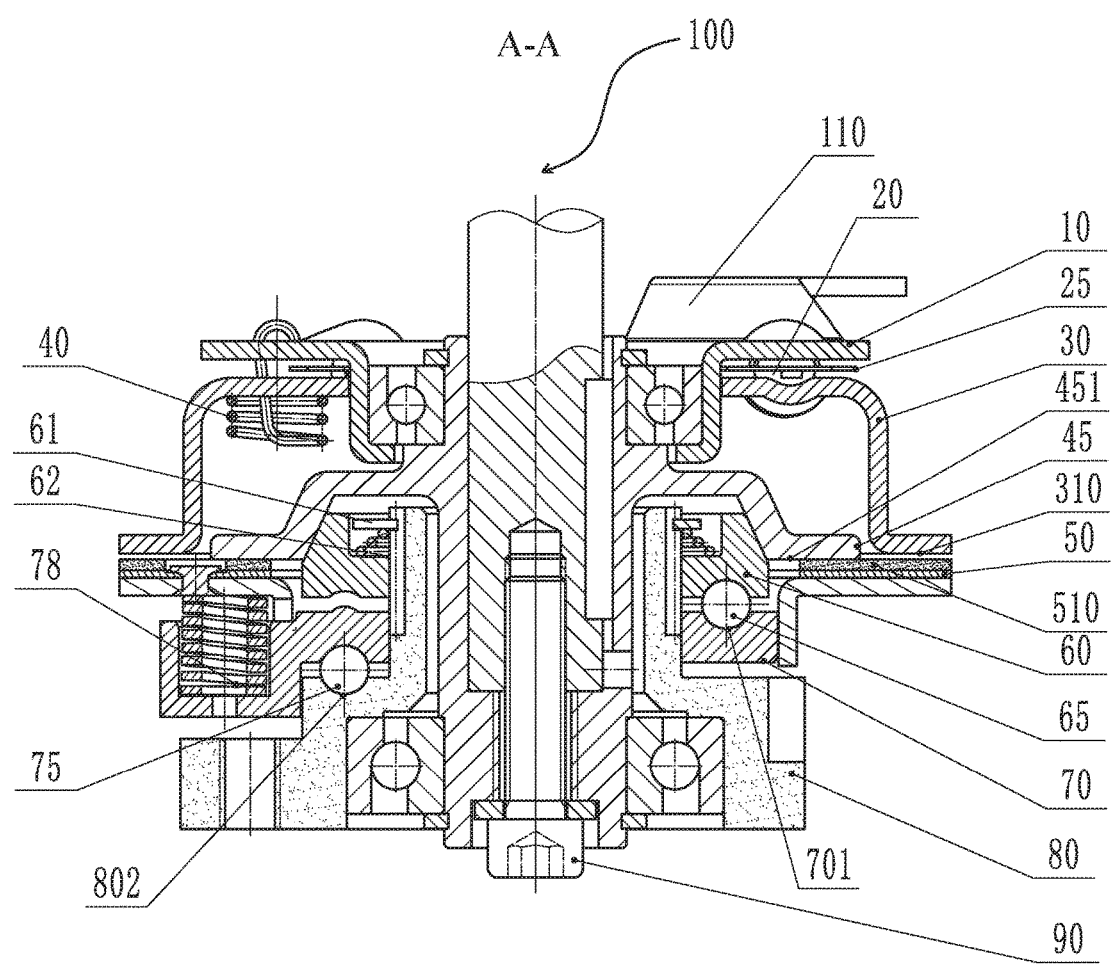
FIG. 4 is a schematic cross-sectional diagram of the clutch-brake device of FIG. 1, with the clutch-brake device in the second coupling state.
Figure 5:
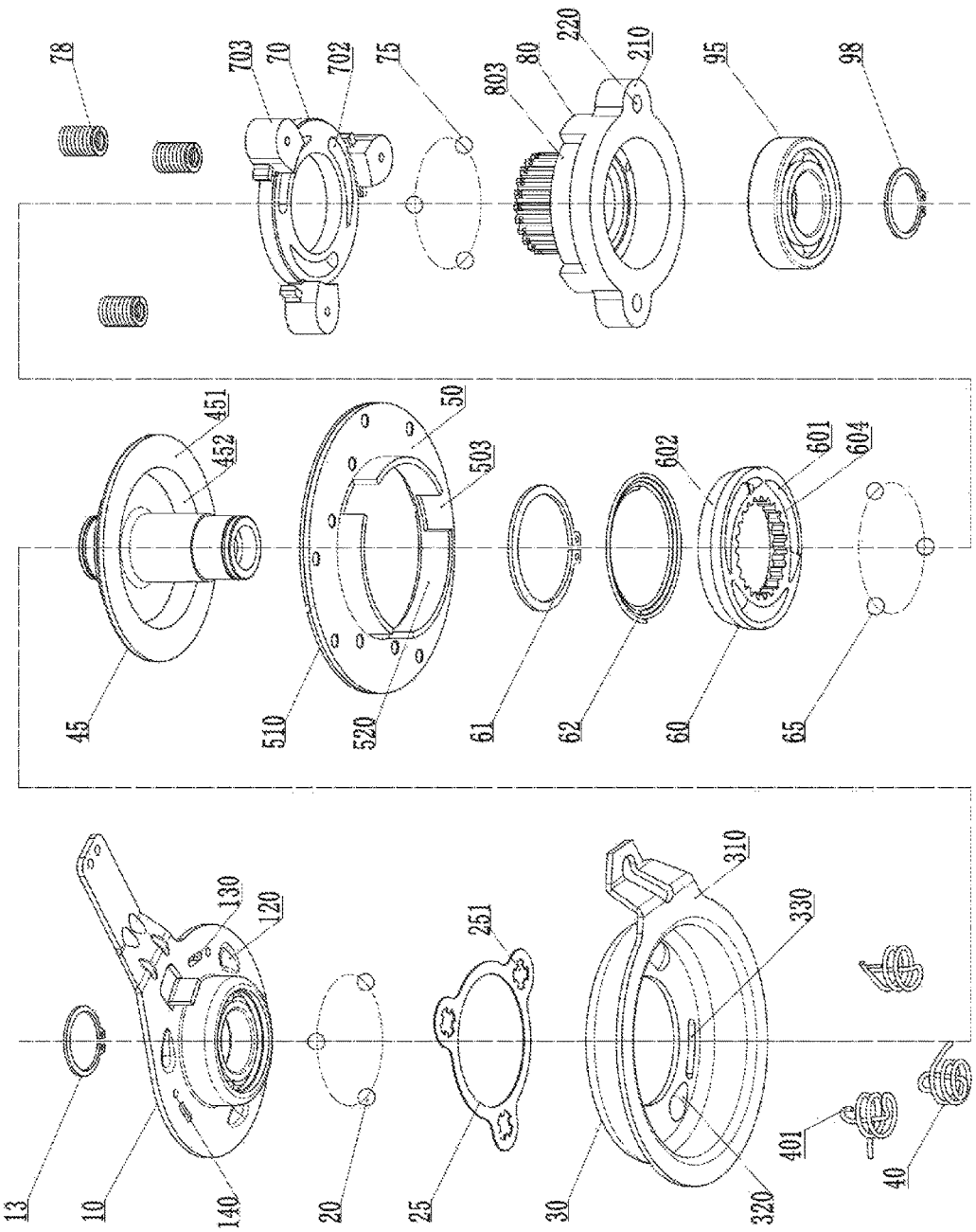
FIG. 5 is an exploded view of the components of the clutch-brake device of the present invention.

Once it is needed to stop operation of the lawn mower, see FIG. 2, the handle 110 of the actuating disc 10 may be pulled or pushed (depending on different designs) to cause the actuating disc to rotate, which forces all of the first steel balls to move from the respective deep areas of the taper grooves 120 provided evenly in the bottom side of the actuating disc 10 along a circumferential direction and the respective deep areas of the taper grooves 320 provided evenly in the top side of the braking disc 30 to the respective shallow areas thereof along the taper grooves 120 and the taper grooves 320, which causes the braking disc 30 to move downward along the axial direction, until that the bottom surface 310 of the braking disc 30 is in contact with the top surface 510 of the friction material of the braking disc 50. With the pressure of the second biasing springs 62, a sufficient friction force is generated to cause the friction disc 50 to stop rotating. Since the friction disc 50 and the intermediate disc 70 are coupled together, the intermediate disc 70 stops rotating accordingly. At this moment, the still rotating frustoconical body 60 and the cutting tool seat 80 rotate relatively to the already stopped intermediate disc 70, which causes the second steel balls 65 to move from the shallow areas of the taper grooves 701 provided in the top side of the intermediate disc 70 and the shallow areas of the taper grooves 601 provided in the bottom side of the frustoconical body 60 to the respective deep areas, and at the same time, causes the third steel balls 75 to move from the shallow areas of the taper grooves 702 provided in the bottom side of the intermediate disc 70 and the shallow areas of the taper grooves 802 provided in the top side of the cutting tool seat 80 to the respective deep areas. Then, the axial pressure exerted on the frustoconical body 60 is removed, and the non-self-locked friction force disappears. With the effect of the weight of frustoconical body 60 itself and the biasing force of the third biasing springs 62, the outer surface of the frustoconical body 60 is separated and disengaged from the inner conical surface 452 of the shaft sleeve flange 45. As such, the frustoconical body 60 and the cutting tool seat 80 also stop rotating, and thus the rotating part of whole system stops rotating except that the shaft sleeve 41 is idling with the driving shaft.

Where it is needed to restart the system, just operate the handle 110 of the actuating disc 10 in the direction opposite to the direction of operation for braking the system to cause the actuating disc 10 to rotate, which forces all of the first steel balls 20 to move from the respective shallow areas of the taper grooves 120 provided evenly in the bottom side of the actuating disc 10 along a circumferential direction and the respective shallow areas of the taper grooves 320 provided in the top side of the braking disc 30 to the respective deep areas thereof along the taper grooves 120 and the taper grooves 320, and with the upward biasing of the first biasing springs 40, the braking disc 30 moves upward in the axial direction, until the bottom surface 310 of the braking disc 30 is separated from the top surface 510 of the friction material of the friction disc 50. With the upward biasing effect of the third biasing springs 78, the top surface 510 of the friction material of the friction disc 50 is in contact and coupled with the bottom surface 451 of the shaft sleeve flange 45. As such, the friction disc 50 is forced to rotate with the shaft sleeve 41. Then the friction disc 50 drives the intermediate disc 70 to rotate, which causes the second steel balls 65 to move from the deep areas of the taper grooves 701 provided in the top side of the intermediate disc 70 and the deep areas of the taper grooves 601 provided in the bottom side of the frustoconical body 60 to the respective shallow areas, and at the same time, causes the third steel balls 75 to move from the deep areas of the taper grooves 702 provided in the bottom side of the intermediate disc 70 and the deep areas of the taper grooves 802 provided in the top side of the cutting tool seat 80 to the respective shallow areas. As such, the intermediate disc 70 and the frustoconical body 60 are forced to move upward in the axial direction and overcome the downward biasing force of the second biasing springs 62, and the outer surface 602 of the frustoconical body 60 is in contact and engaged with the inner conical surface 452 of the shaft sleeve flange 45, so as to cause the frustoconical body 60 to rotate, and in turn cause the cutting tool seat 80 to rotate, so as to have the whole system start working again. See FIGS. 3 and 4.

In this invention, a smaller spring pressure is applied to the outer friction disc 50, while the inner frustoconical body 60 or cylindrical body 60' may be applied with a greater force by the two layers of taper groove force-amplifying structures. Since the outer friction disc is applied with a smaller spring pressure, the spring driving force required to drive the braking disc 30 would be smaller, and accordingly, the force required for operating the actuating disc 10 to cause the braking disc 30 to separate from the friction disc 50 would be smaller. Therefore, it would be easy and convenient to operate the device.

Figure 6:
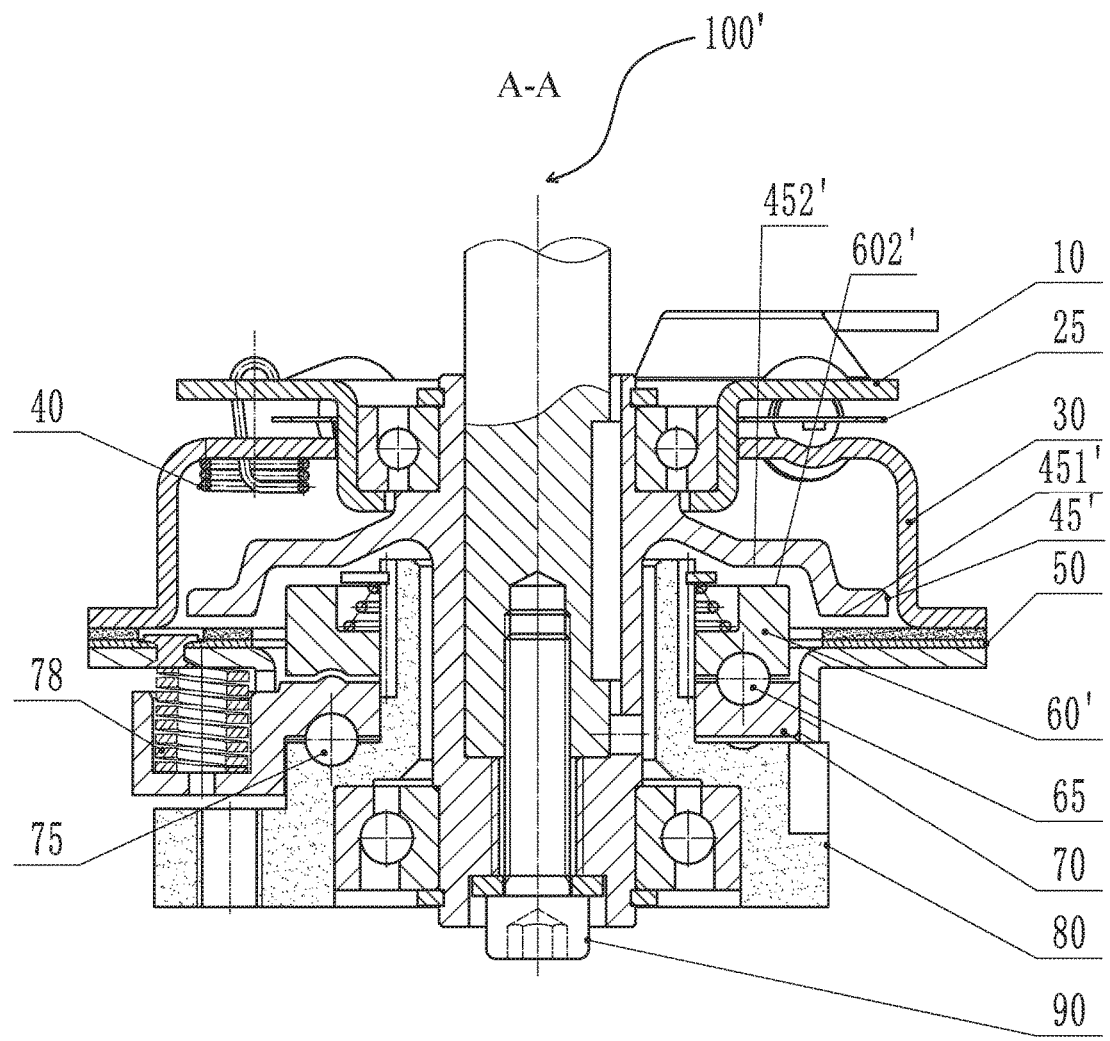
FIG. 6 is a schematic cross-sectional diagram of another clutch-brake device of the present invention, with the clutch-brake device in the braking state.
Figure 7:
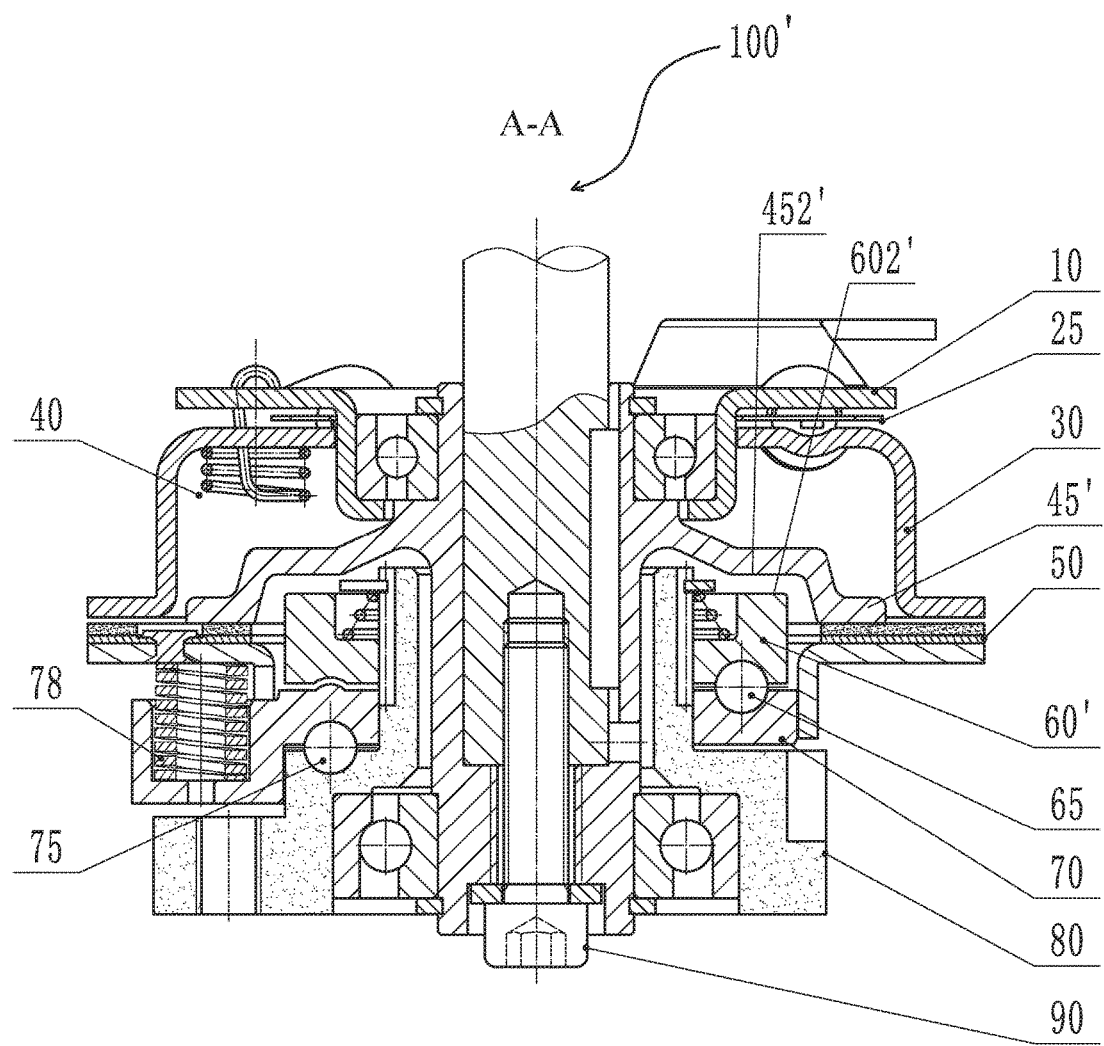
FIG. 7 is a schematic cross-sectional diagram of the clutch-brake device of FIG. 6, with the clutch-brake device in the first coupling state.
Figure 8:
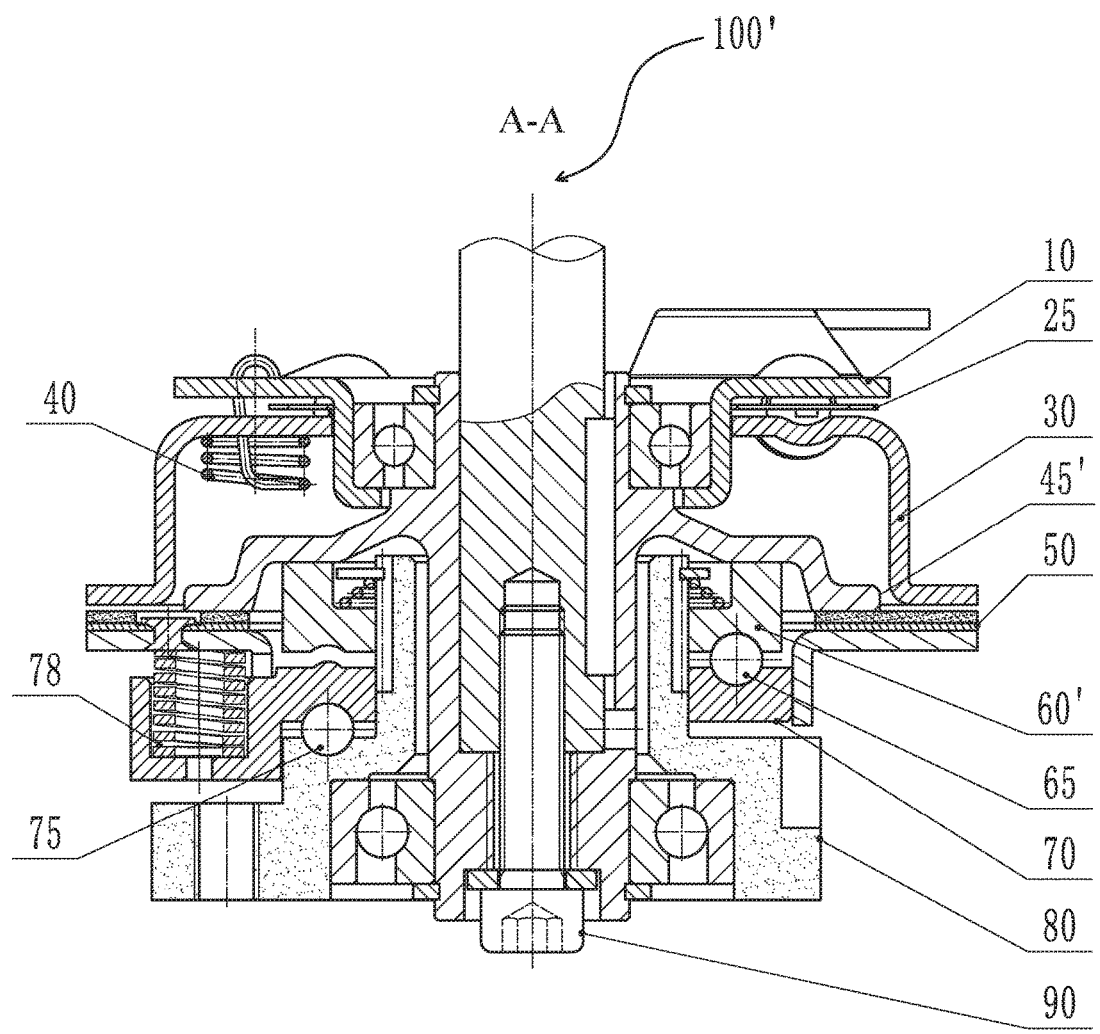
FIG. 8 is a schematic cross-sectional diagram of the clutch-brake device of FIG. 6, with the clutch-brake device in the second coupling state.

FIGS. 6, 7 and 8 illustrate a variation of the above-described brake-clutch device of the present invention. As illustrated in FIGS. 6, 7 and 8, the brake-clutch device 100' is different from the brake-clutch device 100 illustrated in FIGS. 1, 2, 3, 4 and 5 in that the main coupling body is in the form of a cylindrical body 60' that comprises a recessed portion at the top end thereof, inner teeth engaged with the outer teeth of the cutting tool seat 80, a second main coupling surface 602' and a bottom side. The second main coupling surface 602' is at least part of the top side of the cylindrical body 60' and it is used to couple with the first main coupling surface 452' of the shaft sleeve flange 45'.

Both the second main coupling surface 602' and the first main coupling surface 452' are substantially a flat surface, and preferably, both the second main coupling surface 602' and the first main coupling surface 452' are provided with a friction material.

The bottom side of the cylindrical body 60' is provided with a plurality of bottom side taper grooves along a circumferential direction which correspond to the plurality of top side taper grooves of the intermediate disc 70.

The operating principle of the brake-clutch device 100' is the same with the brake-clutch device 100, but with the second main coupling surface 602' being engaged with the first main coupling surface 452' to replace the second main coupling surface 602 being engaged with the first main coupling surface 452 in the brake-clutch device 100, and with the bottom surface 451' of the shaft sleeve flange 45' being engaged with the top surface 510 of the friction material of the friction disc 50 to replace the bottom surface 451 of the shaft sleeve flange 45 being engaged with the top surface 510 of the friction material of the friction disc 50 in the brake-clutch device 100.

While the shaft sleeve flange 45' being configured in a structure fit for the cylindrical body 60' would be easy for one skilled in the art, and it would not be described here in detail.

Other components of the brake-clutch device 100' and the cooperative relationship thereof are the same with the brake-clutch device 100, and it would not be described here in detail.

It should be pointed out that, although the present invention has been described with regard to a lawn mower, the present application should not be limited to this application.

Having described the preferred embodiments of the invention, it is understood that the invention defined by the appended claims is not to be limited by particular details set forth in the above description, as many apparent variations thereof are possible without departing from the spirit or scope thereof.

What is claimed is:

1. A clutch-brake device, comprising:
   a shaft sleeve comprising a shaft sleeve flange and a recessed portion extending inward from a bottom side of the shaft sleeve flange, the recessed portion comprising a first main coupling surface, the shaft sleeve being coupled to a driving shaft at a top end thereof such that the shaft sleeve is able to rotate with the driving shaft, and the shaft sleeve being fixedly connected at a bottom end thereof with the driving shaft;
   a cutting tool seat mounted to a lower end of the shaft sleeve by a first bearing and a first limit ring, the cutting tool seat comprising a top side and a bottom side for mounting a cutting tool, the cutting tool seat being provided with a plurality of indentations in an outer wall thereof, and the cutting tool seat being provided with outer teeth on one end thereof;
   an actuating disc being mounted to the shaft sleeve by a second bearing and a second limit ring, the actuating disc being provided along a circumferential direction with a plurality of taper grooves in a bottom side thereof;
   a braking disc being provided in a top side thereof along a circumferential direction with a plurality of taper grooves cooperating with the plurality of taper grooves in the bottom side of the actuating disc;
   a plurality of first steel balls being able to roll along both the taper grooves provided in the bottom side of the actuating disc and the taper grooves provided in the top side of the braking disc, so as to cause the braking disc to move in the axial direction;
   a plurality of first biasing springs having top ends that extend through biasing spring holes provided in the actuating disc and biasing spring holes provided in the braking disc, and are secured to fixing holes provided in the actuating disc for fixing the top ends of the biasing springs, so as to connect the actuating disc and the braking disc together;
   a friction disc provided under the braking disc and the shaft sleeve flange, and a top side of the friction disc being attached with a friction material in order to form a friction surface, a cylindrical wall being extended from a bottom side of the friction disc, and the cylindrical wall comprising a plurality of openings along a circumferential direction;
   an intermediate disc comprising a top side and a bottom side, the top side being provided therein with a plurality of top side taper grooves along a circumferential direction, the intermediate disc being provided with a plurality of projections extending radially from an outer circumference thereof, the projections comprising biasing spring seat cavities therein, the plurality of projections being fit in the plurality of openings of the friction disc and able to move therein, and being received in the plurality of indentations of the cutting tool seat;
   a main coupling body comprising a top end having a recessed portion, inner teeth to be engaged with outer teeth of the cutting tool seat, a second main coupling surface and a bottom side, the second main coupling surface being adapted to engage with the first coupling surface of the shaft sleeve flange, the main coupling body being provided in the bottom side along a circumferential direction with a plurality of bottom side taper grooves cooperating with the plurality of top side taper grooves of the intermediate disc;
   a second biasing spring sitting in the recessed portion of the main coupling body between the bottom surface of the recessed portion and a third limit ring of the cutting tool seat;
   a plurality of second steel balls being able to roll along the bottom side taper grooves of the main coupling body and the top side taper grooves of the intermediate disc, so as to cause the main coupling body to move in the axial direction; and
   a plurality of third biasing springs sitting respectively between the bottom surfaces of a plurality of biasing spring seat cavities of the intermediate disc and the bottom side of the friction disc.

2. The clutch-brake device according to claim 1, wherein at least a portion of the main coupling body is a frustoconical body, and the second main coupling surface being at least a portion of an outer surface of the frustoconical body, and the first main coupling surface being at least a portion of an inner conical surface of the recessed portion of the shaft sleeve.

3. The clutch-brake device according to claim 2, wherein at least one of the first main coupling surface and the second main coupling surface is provided with a friction material.

4. The clutch-brake device according to claim 1, wherein the main coupling body being a cylindrical body, and the second main coupling surface being at least a portion of a top surface of the cylindrical body, the first main coupling surface being at least a portion of a top end surface of the recessed portion of the shaft sleeve.

5. The clutch-brake device according to claim 4, wherein at least one of the first main coupling surface and the second main coupling surface is provided with a friction material.

6. The clutch-brake device according to claim 1, wherein at least one of the first main coupling surface and the second main coupling surface is provided with a friction material.

7. The clutch-brake device according to claim 6, wherein said plurality is three.

8. A clutch-brake device, comprising:
a shaft sleeve comprising a shaft sleeve flange and a recessed portion extending inward from a bottom side of the shaft sleeve flange, the recessed portion comprising a first main coupling surface, the shaft sleeve being coupled to a driving shaft at a top end thereof such that the shaft sleeve is able to rotate with the driving shaft, and the shaft sleeve being fixedly connected at a bottom end thereof with the driving shaft;
a cutting tool seat mounted to a lower end of the shaft sleeve by a first bearing and a first limit ring, the cutting tool seat comprising a top side and a bottom side for mounting a cutting tool, the top side being provided with a plurality of top side taper grooves along a circumferential direction, the cutting tool seat being provided with a plurality of indentations in the outer wall thereof, and the cutting tool seat being provided with outer teeth on one end thereof;
an actuating disc mounted to the shaft sleeve by a second bearing and a second limit ring, the actuating disc being provided with a plurality of taper grooves in a bottom side thereof along a circumferential direction;
a braking disc being provided in a top side thereof along a circumferential direction with a plurality of taper grooves cooperating with the plurality of taper grooves in the bottom side of the actuating disc;
a plurality of first steel balls able to roll along both the taper grooves provided in the bottom side of the actuating disc and the taper grooves provided in the top side of the braking disc, so as to cause the braking disc to move in an axial direction;
a plurality of first biasing springs having top ends that extend through biasing spring holes provided in the actuating disc and respective biasing spring holes provided in the braking disc, and are secured to respective fixing holes provided in the actuating disc for fixing the top ends of the biasing springs, so as to connect the actuating disc and the braking disc together;
a friction disc provided under the braking disc and the shaft sleeve flange, and a top side of the friction disc being attached with a friction material in order to form a top friction surface, a cylindrical wall being extended from a bottom side of the friction disc, and the cylindrical wall comprising a plurality of openings along a circumferential direction;
an intermediate disc comprising a top side and a bottom side, the top side being provided therein with a plurality of top side taper grooves along a circumferential direction, the bottom side being provided therein with a plurality of bottom side taper grooves along a circumferential direction, the intermediate disc being provided with a plurality of projections extending radially from an outer circumference thereof, the projections comprising biasing spring seat cavities therein, the plurality of projections being fit in the plurality of openings of the friction disc and able to move therein, and being received in the plurality of indentations of the cutting tool seat;
a main coupling body comprising a top end having a recessed portion, inner teeth to be engaged with the outer teeth of the cutting tool seat, a second main coupling surface and a bottom side, the second main coupling surface being adapted to engage with the first main coupling surface of the shaft sleeve flange, the main coupling body being provided in the bottom side along the circumferential direction with a plurality of bottom side taper grooves cooperating with the plurality of top side taper grooves of the intermediate disc;
a second biasing spring sitting in the recessed portion of the main coupling body between the bottom surface of the recessed portion and a second limit ring of the cutting tool seat;
a plurality of second steel balls able to roll along the bottom side taper grooves of the main coupling body and the top side taper grooves of the intermediate disc, so as to cause the main coupling body to move in the axial direction;
a plurality of third steel balls able to roll along the bottom side taper grooves of the intermediate disc and the top side taper grooves of the cutting tool seat, so as to cause the intermediate disc to move in the axial direction; and
a plurality of third biasing springs sitting respectively between bottom surfaces of the plurality of biasing spring seat cavities and the bottom side of the friction disc.

9. The clutch-brake device according to claim 8, wherein at least a portion of the main coupling body is a frustoconical body, and the second main coupling surface being at least a portion of an outer surface of the frustoconical body, and the first main coupling surface being at least a portion of the inner conical surface of the recessed portion of said shaft sleeve.

10. The clutch-brake device according to claim 9, wherein at least one of the first main coupling surface and the second main coupling surface is provided with a friction material.

11. The clutch-brake device according to claim 8, wherein the main coupling body being a cylindrical body, and the second main coupling surface being at least a portion of a top surface of the cylindrical body, the first main coupling surface being at least a portion of a top end surface of the recessed portion of said shaft sleeve.

12. The clutch-brake device according to claim 11, wherein at least one of the first main coupling surface and the second main coupling surface is provided with a friction material.

13. The clutch-brake device according to claim 8, wherein at least one of the first main coupling surface and the second main coupling surface is provided with a friction material.

14. The clutch-brake device according to claim 13, wherein said plurality is three.

\* \* \* \* \*